United States Patent
Baker et al.

(10) Patent No.: US 12,289,508 B2
(45) Date of Patent: Apr. 29, 2025

(54) DETACHABLE CAMERA FOR A SMOKER OR GRILL

(71) Applicant: GMG Products, LLC, Lakeside, OR (US)

(72) Inventors: David W. Baker, Lakeside, OR (US); Alexander Steven McCown, Angleton, TX (US); Edward Murray Samuels, San Diego, CA (US)

(73) Assignee: GMG Products, LLC, Lakeside, OR (US)

( * ) Notice: Subject to any disclaimer, the term of this patent is extended or adjusted under 35 U.S.C. 154(b) by 219 days.

(21) Appl. No.: 18/094,335

(22) Filed: Jan. 6, 2023

(65) Prior Publication Data

US 2023/0300436 A1    Sep. 21, 2023

Related U.S. Application Data

(60) Provisional application No. 63/321,660, filed on Mar. 18, 2022.

(51) Int. Cl.
*H04N 23/53* (2023.01)
*H04N 23/52* (2023.01)

(52) U.S. Cl.
CPC ........... *H04N 23/531* (2023.01); *H04N 23/52* (2023.01)

(58) Field of Classification Search
CPC .............................. H04N 23/531; H04N 23/52
See application file for complete search history.

(56) References Cited

U.S. PATENT DOCUMENTS

| 100,410 A | 3/1870 | Hull |
| 103,736 A | 5/1870 | Gregory |
| 119,169 A | 9/1871 | Ogden |
| 161,577 A | 3/1875 | Thomas |
| 382,886 A | 5/1888 | Lee |
| 1,038,420 A | 9/1912 | Newcomer et al. |
| 1,433,062 A | 10/1922 | Bellamy |

(Continued)

FOREIGN PATENT DOCUMENTS

| AT | 411098 | 9/2003 |
| CN | 102300492 | 12/2011 |

(Continued)

OTHER PUBLICATIONS

International Preliminary Report on Patentability dated May 17, 2022, in International Patent Application No. PCT/US2020/062211, 9 pages.

(Continued)

*Primary Examiner* — Timothy J Henn
(74) *Attorney, Agent, or Firm* — Lowe Graham Jones PLLC (57) ABSTRACT

A detachable camera assembly is securable to a cooking tool by means of magnets on a lower surface. The housing is offset from the cooking tool by the magnets and a shroud extends between a camera opening and the cooking tool with a seal at the end of the shroud. A fan draws air into the housing and expels part of the air through the shroud. A part of the air also flows through openings for allowing light to exit the housing from LEDs mounted within the housing. A controller within the housing captures and transmits images responsive to instructions received using a wireless transceiver.

20 Claims, 7 Drawing Sheets

(56) References Cited

U.S. PATENT DOCUMENTS

| | | | |
|---|---|---|---|
| RE16,011 E | 3/1925 | Simon |
| 1,650,634 A | 11/1927 | Lutzler |
| 1,755,674 A | 4/1930 | Tauriainen |
| 1,919,407 A | 7/1933 | Wood |
| 1,938,565 A | 12/1933 | Anderson |
| 1,960,778 A | 5/1934 | Goss et al. |
| 2,068,018 A | 1/1937 | Goetz |
| 2,354,240 A | 7/1944 | Young et al. |
| 2,365,679 A | 12/1944 | Casey |
| 2,620,970 A | 12/1952 | Palmer et al. |
| 2,641,085 A | 6/1953 | Robinson et al. |
| 2,833,363 A | 5/1958 | Henehan |
| 2,997,566 A | 8/1961 | Pierce et al. |
| 3,021,386 A | 2/1962 | Clark |
| 3,073,263 A | 1/1963 | Wynkoop |
| 3,307,506 A | 3/1967 | Rose |
| 3,327,698 A | 6/1967 | Leslie |
| 3,384,066 A | 5/1968 | Tufts |
| 3,413,935 A | 12/1968 | Behrns |
| 3,453,975 A | 7/1969 | Gunter |
| 3,474,725 A | 10/1969 | McClaren |
| 3,586,518 A | 6/1971 | Folmar |
| 3,609,236 A | 9/1971 | Heilman |
| 3,739,732 A | 6/1973 | Graham |
| 3,742,839 A | 7/1973 | Maley |
| 3,745,303 A | 7/1973 | Epperson et al. |
| 3,765,397 A | 10/1973 | Henderson |
| 3,814,005 A | 6/1974 | Widdel |
| 3,838,249 A | 9/1974 | Detterbeck |
| 3,903,866 A | 9/1975 | Polinski |
| 3,934,520 A | 1/1976 | Brennan et al. |
| 4,020,322 A | 4/1977 | Muse |
| 4,094,295 A | 6/1978 | Boswell et al. |
| 4,094,649 A | 6/1978 | Osterried |
| 4,227,510 A | 10/1980 | Frazier et al. |
| 4,241,650 A | 12/1980 | John et al. |
| 4,334,462 A | 6/1982 | Hefling |
| 4,374,489 A | 2/1983 | Robbins |
| 4,395,958 A | 8/1983 | Caffyn et al. |
| 4,401,017 A | 8/1983 | Feld |
| D270,987 S | 10/1983 | Scheufler |
| 4,413,609 A | 11/1983 | Tisdale |
| 4,417,565 A | 11/1983 | Karpinia |
| 4,454,805 A | 6/1984 | Matthews |
| 4,481,408 A | 11/1984 | Scheufler |
| 4,491,722 A | 1/1985 | Fischer et al. |
| 4,495,860 A | 1/1985 | Hitch et al. |
| 4,503,835 A | 3/1985 | Williams |
| 4,508,094 A | 4/1985 | Hait |
| 4,509,412 A | 4/1985 | Whittenburg et al. |
| 4,510,916 A | 4/1985 | Ogden |
| 4,512,249 A | 4/1985 | Mentzel |
| 4,531,505 A | 7/1985 | Hait et al. |
| 4,531,507 A | 7/1985 | Gerson |
| 4,539,973 A | 9/1985 | Hait |
| 4,554,864 A | 11/1985 | Smith et al. |
| 4,574,776 A | 3/1986 | Hidle |
| 4,587,947 A | 5/1986 | Tomita |
| 4,591,698 A | 5/1986 | Chang |
| 4,603,679 A | 8/1986 | Ogden |
| 4,624,238 A | 11/1986 | Hait |
| 4,626,352 A | 12/1986 | Massey et al. |
| 4,628,351 A | 12/1986 | Heo |
| 4,638,787 A | 1/1987 | Tyson |
| 4,706,643 A | 11/1987 | Tyson |
| 4,711,979 A | 12/1987 | Glasser et al. |
| 4,714,013 A | 12/1987 | Telfer |
| 4,721,037 A | 1/1988 | Blosnich |
| 4,762,056 A | 8/1988 | Virag |
| 4,788,905 A | 12/1988 | Von Kohorn |
| 4,803,921 A | 2/1989 | Nuss |
| 4,867,050 A | 9/1989 | Patenaude et al. |
| 4,877,010 A | 10/1989 | Hait |
| 4,909,235 A | 3/1990 | Boetcker |
| 4,909,237 A | 3/1990 | Karpinia |
| 4,910,372 A | 3/1990 | Vukich |
| 4,938,202 A | 7/1990 | Hait |
| 4,958,578 A | 9/1990 | Houser |
| 4,962,696 A | 10/1990 | Gillis |
| 4,976,252 A | 12/1990 | Cianciola |
| 4,987,827 A | 1/1991 | Marquez |
| 5,070,777 A | 12/1991 | Novak |
| 5,086,752 A | 2/1992 | Hait |
| 5,094,223 A | 3/1992 | Gonzalez |
| 5,094,280 A | 3/1992 | Kahilahti et al. |
| 5,097,817 A | 3/1992 | Dodgen |
| 5,123,360 A | 6/1992 | Burke et al. |
| 5,154,159 A | 10/1992 | Knafelc et al. |
| 5,167,183 A | 12/1992 | Schlosser et al. |
| 5,168,796 A | 12/1992 | Porton et al. |
| 5,172,682 A | 12/1992 | Luebke et al. |
| 5,176,067 A | 1/1993 | Higgins |
| 5,176,124 A | 1/1993 | Wrasse |
| 5,185,047 A | 2/1993 | Ray |
| D333,941 S | 3/1993 | Hait |
| 5,195,423 A | 3/1993 | Beller |
| 5,197,379 A | 3/1993 | Leonard, Jr. |
| 5,197,455 A | 3/1993 | Tessien |
| 5,218,950 A | 6/1993 | Hait |
| 5,253,634 A | 10/1993 | LeBeouf |
| 5,269,286 A | 12/1993 | Cowan |
| 5,276,307 A | 1/1994 | Higgins |
| 5,287,799 A | 2/1994 | Pickering et al. |
| 5,313,877 A | 5/1994 | Holland |
| D347,548 S | 6/1994 | Boehm et al. |
| 5,359,988 A | 11/1994 | Hait |
| 5,425,352 A | 6/1995 | Gillam et al. |
| 5,437,222 A | 8/1995 | Franklin |
| 5,469,835 A | 11/1995 | Stephen et al. |
| 5,473,980 A | 12/1995 | Carpenter |
| 5,495,845 A | 3/1996 | Hait |
| 5,516,009 A | 5/1996 | Kautz |
| 5,517,902 A | 5/1996 | Boston |
| 5,524,610 A | 6/1996 | Clark |
| 5,528,984 A | 6/1996 | Saurwein |
| D376,510 S | 12/1996 | Ting |
| 5,586,488 A | 12/1996 | Liu |
| 5,605,092 A | 2/1997 | Riccio |
| 5,617,778 A | 4/1997 | Schroeter et al. |
| D379,900 S | 6/1997 | Gillam et al. |
| 5,649,477 A | 7/1997 | Lingwood |
| 5,655,435 A | 8/1997 | Rachesky |
| 5,687,704 A | 11/1997 | Lerch et al. |
| 5,775,315 A | 7/1998 | Baykal |
| 5,797,386 A | 8/1998 | Orr |
| 5,809,871 A | 9/1998 | Arathoon |
| 5,809,991 A | 9/1998 | Pai |
| 5,821,507 A | 10/1998 | Sasaki et al. |
| 5,884,006 A | 3/1999 | Frohlich et al. |
| 5,891,498 A | 4/1999 | Boehler |
| D411,407 S | 6/1999 | Anthony |
| 5,957,038 A | 9/1999 | Shimazaki |
| 6,035,770 A | 3/2000 | Whitefield |
| 6,055,901 A | 5/2000 | Gantos et al. |
| 6,058,832 A | 5/2000 | Fountain |
| 6,065,464 A | 5/2000 | Zajec |
| 6,065,466 A | 5/2000 | Baykal |
| 6,076,515 A | 6/2000 | Smith |
| 6,097,004 A | 8/2000 | Seul |
| 6,103,291 A | 8/2000 | Fernandez Tapia |
| 6,108,489 A | 8/2000 | Frohlich et al. |
| 6,125,740 A | 10/2000 | Hedrington et al. |
| 6,161,534 A | 12/2000 | Kronman |
| 6,167,799 B1 | 1/2001 | Macias |
| 6,176,173 B1 | 1/2001 | Holbrook et al. |
| 6,187,359 B1 | 2/2001 | Zuccarini |
| D439,792 S | 4/2001 | Hedrington et al. |
| 6,213,006 B1 | 4/2001 | Reardon et al. |
| 6,223,737 B1 | 5/2001 | Buckner |
| 6,229,563 B1 | 5/2001 | Miller, II et al. |
| 6,263,786 B1 | 7/2001 | Raio et al. |
| 6,289,795 B1 | 9/2001 | McLemore et al. |
| 6,307,193 B1 | 10/2001 | Toole |
| 6,314,868 B1 | 11/2001 | Christensen et al. |

(56) References Cited

U.S. PATENT DOCUMENTS

| | | |
|---|---|---|
| 6,314,869 B1 | 11/2001 | Bourgeois, Jr. |
| 6,425,388 B1 | 7/2002 | Korinchock |
| 6,467,400 B2 | 10/2002 | Raio et al. |
| 6,523,463 B1 | 2/2003 | Hogle |
| 6,525,299 B2 | 2/2003 | Hannon et al. |
| 6,546,849 B1 | 4/2003 | Shimazaki |
| 6,568,314 B1 | 5/2003 | Stepanova |
| 6,640,695 B2 | 11/2003 | Stark |
| 6,675,794 B1 | 1/2004 | Yang |
| 6,688,301 B1 | 2/2004 | McNeill |
| 6,874,495 B2 | 4/2005 | McFadden |
| 6,874,496 B2 | 4/2005 | Waits et al. |
| 7,021,202 B2 | 4/2006 | Sizer |
| 7,101,583 B1 | 9/2006 | Bove |
| 7,107,983 B1 | 9/2006 | West |
| 7,312,424 B2 | 12/2007 | Hannon et al. |
| 7,337,712 B1 | 3/2008 | Wang et al. |
| 7,449,665 B2 | 11/2008 | Fadelli et al. |
| 7,467,718 B1 | 12/2008 | Donohue |
| 7,575,002 B2 | 8/2009 | DeMars et al. |
| 7,681,493 B2 | 3/2010 | Moore |
| 7,685,931 B2 | 3/2010 | Rivera |
| 7,686,010 B2 | 3/2010 | Gustavsen |
| D623,013 S | 9/2010 | Alden et al. |
| D624,781 S | 10/2010 | Allen et al. |
| 7,832,330 B1 | 11/2010 | Thompson |
| 7,900,553 B1 | 3/2011 | Maurin |
| 7,900,624 B2 | 3/2011 | DeMars et al. |
| D640,896 S | 7/2011 | Molayem |
| D642,421 S | 8/2011 | Difante |
| 8,067,716 B1 | 11/2011 | Lloyd |
| D653,074 S | 1/2012 | Difante |
| D658,424 S | 5/2012 | Difante |
| D658,425 S | 5/2012 | Difante |
| 8,181,640 B2 | 5/2012 | Park |
| 8,291,896 B1 | 10/2012 | Gonnella et al. |
| 8,365,717 B1 | 2/2013 | Perry |
| D687,257 S | 8/2013 | DiFante |
| 8,578,927 B2 | 11/2013 | Gustavsen |
| 8,651,018 B1 | 2/2014 | Loud, III |
| 8,662,069 B2 | 3/2014 | Gasparini et al. |
| 8,662,070 B2 | 3/2014 | Johnston |
| 8,720,322 B2 | 5/2014 | West |
| D707,075 S | 6/2014 | Fung |
| 8,752,479 B2 | 6/2014 | Sacherman et al. |
| 8,763,519 B2 | 7/2014 | Ricchio et al. |
| 8,826,806 B2 | 9/2014 | Difante |
| 9,003,962 B2 | 4/2015 | Broerman |
| D733,483 S | 7/2015 | Baker et al. |
| 9,182,129 B2 | 11/2015 | Dahle et al. |
| 9,226,343 B2 | 12/2015 | Moon et al. |
| D748,424 S | 2/2016 | Funnell, II et al. |
| 9,504,352 B2 | 11/2016 | Lin |
| D782,864 S | 4/2017 | Bhogal et al. |
| D784,730 S | 4/2017 | Kruger |
| D784,759 S | 4/2017 | Nadal |
| D786,014 S | 5/2017 | Knight |
| 9,635,979 B2 | 5/2017 | Abrams et al. |
| 9,644,847 B2 | 5/2017 | Bhogal et al. |
| 9,668,615 B2 | 6/2017 | Contarino, Jr. |
| 9,702,563 B2 | 7/2017 | Probst et al. |
| 9,718,220 B1 | 8/2017 | Claridge Huggins |
| D802,996 S | 11/2017 | Bhogal et al. |
| 9,848,731 B2 | 12/2017 | Dahle et al. |
| 9,879,435 B2 | 1/2018 | Kruger et al. |
| D812,973 S | 3/2018 | Nadal |
| 9,927,129 B2 | 3/2018 | Bhogal et al. |
| 9,970,661 B2 | 5/2018 | Calvin |
| 10,021,889 B2 | 7/2018 | Vinett |
| 10,024,544 B2 | 7/2018 | Bhogal et al. |
| 10,058,172 B2 | 8/2018 | Staib |
| D828,713 S | 9/2018 | Correa |
| D844,961 S | 4/2019 | Toms, Jr. et al. |
| 10,292,531 B1 | 5/2019 | Hancock et al. |
| D861,409 S | 10/2019 | Bhogal et al. |
| 10,523,851 B2 | 12/2019 | Armstrong |
| 10,674,569 B2 | 6/2020 | Luckhardt et al. |
| 10,778,876 B2 | 9/2020 | Goettlein |
| D901,244 S | 11/2020 | Baker et al. |
| D921,413 S | 6/2021 | Fitzpatrick |
| 11,166,590 B2 | 11/2021 | Zheng |
| 2002/0017290 A1 | 2/2002 | Hines, Jr. |
| 2002/0069764 A1 | 6/2002 | Cohen |
| 2002/0166460 A1 | 11/2002 | O'Shea |
| 2003/0001721 A1 | 1/2003 | Daum et al. |
| 2003/0096159 A1 | 5/2003 | Suzuki |
| 2004/0020482 A1 | 2/2004 | Chen |
| 2004/0025862 A1 | 2/2004 | Lor et al. |
| 2004/0094142 A1 | 5/2004 | Christensen et al. |
| 2004/0154611 A1 | 8/2004 | Beech |
| 2004/0226454 A1 | 11/2004 | Pirkle et al. |
| 2004/0255926 A1 | 12/2004 | Waits et al. |
| 2005/0098168 A1 | 5/2005 | Williams et al. |
| 2005/0205076 A1 | 9/2005 | Boucher |
| 2006/0042475 A1 | 3/2006 | Craig |
| 2006/0102167 A1 | 5/2006 | Driscoll, Jr. |
| 2006/0124120 A1 | 6/2006 | Gross |
| 2006/0225580 A1 | 10/2006 | Fernandez et al. |
| 2006/0236995 A1 | 10/2006 | Chang |
| 2006/0260603 A1 | 11/2006 | Shah |
| 2007/0006863 A1 | 1/2007 | Barbarich |
| 2007/0108177 A1 | 5/2007 | Engelhardt |
| 2007/0169636 A1 | 7/2007 | Carlson et al. |
| 2007/0221191 A1 | 9/2007 | O'Brien et al. |
| 2007/0246453 A1 | 10/2007 | Nam et al. |
| 2007/0277800 A1 | 12/2007 | Chiang |
| 2008/0000467 A1 | 1/2008 | Dudley et al. |
| 2008/0047540 A1 | 2/2008 | Hoffman et al. |
| 2008/0085172 A1 | 4/2008 | Harman et al. |
| 2008/0196708 A1 | 8/2008 | Lee |
| 2008/0230043 A1 | 9/2008 | Bruno |
| 2008/0247313 A1 | 10/2008 | Nath et al. |
| 2009/0004348 A1 | 1/2009 | Silva |
| 2009/0064985 A1 | 3/2009 | Gustavsen |
| 2009/0078246 A1 | 3/2009 | Leavens et al. |
| 2009/0165772 A1 | 7/2009 | Hunt et al. |
| 2009/0173238 A1 | 7/2009 | Martinez et al. |
| 2009/0229476 A1 | 9/2009 | Bedard |
| 2009/0293860 A1 | 12/2009 | Carlson |
| 2009/0301463 A1 | 12/2009 | Park |
| 2010/0051600 A1 | 3/2010 | Maier |
| 2010/0084355 A1 | 4/2010 | Parks et al. |
| 2010/0124596 A1 | 5/2010 | Nelson |
| 2010/0147281 A1 | 6/2010 | Gustavsen |
| 2010/0218754 A1 | 9/2010 | Kuntz |
| 2010/0258104 A1 | 10/2010 | DeFoort et al. |
| 2011/0048399 A1 | 3/2011 | Hong |
| 2011/0123689 A1 | 5/2011 | Luckhardt et al. |
| 2011/0132347 A1 | 6/2011 | Kim |
| 2011/0197872 A1 | 8/2011 | Thiry |
| 2011/0214662 A1 | 9/2011 | Contarino, Jr. |
| 2011/0219957 A1 | 9/2011 | Fogolin |
| 2011/0219958 A1 | 9/2011 | Noble |
| 2011/0265663 A1 | 11/2011 | Li |
| 2012/0017884 A1 | 1/2012 | Van Den Hoff et al. |
| 2012/0060819 A1 | 3/2012 | Hunt et al. |
| 2012/0076351 A1 | 3/2012 | Yoon et al. |
| 2012/0107476 A1 | 5/2012 | McLemore et al. |
| 2012/0174798 A1 | 7/2012 | Kulikowski |
| 2012/0225178 A1 | 9/2012 | Degnan |
| 2012/0240790 A1 | 9/2012 | Difante |
| 2012/0258229 A1 | 10/2012 | Mindrup |
| 2012/0260903 A1 | 10/2012 | Buerkle |
| 2012/0269028 A1 | 10/2012 | Gordon |
| 2013/0074702 A1 | 3/2013 | Difante |
| 2013/0081609 A1 | 4/2013 | Dhuper et al. |
| 2013/0112186 A1 | 5/2013 | Crichlow |
| 2013/0125765 A1 | 5/2013 | Difante |
| 2013/0276643 A1 | 10/2013 | Krolick et al. |
| 2013/0319258 A1 | 12/2013 | Cleveland et al. |
| 2014/0026762 A1 | 1/2014 | Riefenstein |
| 2014/0026881 A1 | 1/2014 | Abrams et al. |
| 2014/0048055 A1 | 2/2014 | Ruther |
| 2014/0130788 A1 | 5/2014 | Contarino, Jr. |

(56) References Cited

U.S. PATENT DOCUMENTS

| | | |
|---|---|---|
| 2014/0144333 A1 | 5/2014 | Ahmed |
| 2014/0165851 A1 | 6/2014 | Shingler |
| 2014/0196609 A1 | 7/2014 | Snyman |
| 2014/0251160 A1 | 9/2014 | Contarino, Jr. |
| 2014/0287119 A1 | 9/2014 | Dahle et al. |
| 2014/0299005 A1 | 10/2014 | Vinett |
| 2015/0027432 A1 | 1/2015 | Contarino, Jr. |
| 2015/0034065 A1 | 2/2015 | McQuillan |
| 2015/0068512 A1 | 3/2015 | Mehler et al. |
| 2015/0079250 A1 | 3/2015 | Ahmed |
| 2015/0114238 A1 | 4/2015 | Palermo |
| 2015/0124849 A1 | 5/2015 | Parthasarathy |
| 2015/0164278 A1 | 6/2015 | Kohler et al. |
| 2015/0201805 A1 | 7/2015 | Cedar et al. |
| 2015/0208669 A1 | 7/2015 | Klock et al. |
| 2015/0233585 A1 | 8/2015 | Creel |
| 2015/0253364 A1 | 9/2015 | Hieda et al. |
| 2015/0285512 A1 | 10/2015 | Matarazzi et al. |
| 2015/0285513 A1 | 10/2015 | Matarazzi et al. |
| 2015/0289719 A1 | 10/2015 | Contarino, Jr. |
| 2015/0297029 A1 | 10/2015 | Smith et al. |
| 2015/0305560 A1 | 10/2015 | Hamlin |
| 2015/0320259 A1 | 11/2015 | Tucker |
| 2015/0338104 A1 | 11/2015 | Lipinski |
| 2015/0371513 A1 | 12/2015 | Stokes |
| 2016/0102868 A1 | 4/2016 | Johnson et al. |
| 2016/0102869 A1 | 4/2016 | Johnson et al. |
| 2016/0174766 A1 | 6/2016 | Schlosser et al. |
| 2016/0183723 A1 | 6/2016 | Nadal |
| 2016/0183724 A1 | 6/2016 | Nadal |
| 2016/0227965 A1 | 8/2016 | Johnston et al. |
| 2016/0302606 A1 | 10/2016 | Kallos |
| 2016/0334112 A1 | 11/2016 | Wiseman et al. |
| 2016/0366314 A1 | 12/2016 | Pfaffinger, Jr. et al. |
| 2017/0020148 A1 | 1/2017 | Dixon et al. |
| 2017/0020337 A1 | 1/2017 | Borovicka et al. |
| 2017/0055535 A1 | 3/2017 | Froelicher et al. |
| 2017/0065124 A1 | 3/2017 | Colston |
| 2017/0074522 A1 | 3/2017 | Cheng |
| 2017/0102149 A1 | 4/2017 | Nadal |
| 2017/0115008 A1 | 4/2017 | Erbe et al. |
| 2017/0195542 A1* | 7/2017 | Thomas ................ H04N 23/63 |
| 2017/0257226 A1 | 9/2017 | Bi |
| 2017/0261213 A1 | 9/2017 | Park et al. |
| 2017/0303348 A1 | 10/2017 | Kondo et al. |
| 2017/0332841 A1 | 11/2017 | Reischmann |
| 2018/0058702 A1 | 3/2018 | Jang et al. |
| 2018/0157232 A1 | 6/2018 | Chen |
| 2018/0187898 A1 | 7/2018 | Matarazzi et al. |
| 2018/0296031 A1 | 10/2018 | Terrell, Jr. et al. |
| 2018/0324908 A1 | 11/2018 | Denker et al. |
| 2018/0325314 A1 | 11/2018 | Walters |
| 2018/0347821 A1 | 12/2018 | Wild |
| 2018/0368618 A1 | 12/2018 | Measom et al. |
| 2018/0372326 A1* | 12/2018 | Park ........................ F27D 21/02 |
| 2019/0132396 A1 | 5/2019 | Finnegan et al. |
| 2019/0134580 A1* | 5/2019 | Ghazarian ............. B01F 35/221 |
| 2019/0274476 A1 | 9/2019 | Dahle et al. |
| 2019/0277509 A1* | 9/2019 | Hildner ................... F24C 7/08 |
| 2019/0285283 A1 | 9/2019 | Ebrom et al. |
| 2019/0298107 A1 | 10/2019 | Baker et al. |
| 2020/0041134 A1 | 2/2020 | Luckhardt et al. |
| 2020/0069111 A1 | 3/2020 | Eiter et al. |
| 2020/0154943 A1 | 5/2020 | Baker |
| 2020/0154944 A1* | 5/2020 | Baker .................... H04N 7/183 |
| 2020/0214503 A1 | 7/2020 | Altenritter |
| 2020/0236743 A1 | 7/2020 | Yang et al. |
| 2020/0281402 A1 | 9/2020 | Witzel et al. |
| 2021/0052107 A1 | 2/2021 | Pruitt et al. |
| 2021/0071871 A1 | 3/2021 | Stork-Wersborg |
| 2021/0113016 A1 | 4/2021 | Dean |
| 2021/0152578 A1 | 5/2021 | Alanazi |
| 2021/0222887 A1 | 7/2021 | Moore et al. |
| 2021/0401223 A1 | 12/2021 | Han et al. |
| 2022/0373173 A1 | 11/2022 | Chlebovec |
| 2023/0083403 A1 | 3/2023 | Jun et al. |

FOREIGN PATENT DOCUMENTS

| | | |
|---|---|---|
| CN | 206669789 U | 11/2017 |
| CN | 107616719 | 1/2018 |
| CN | 213189188 U | 5/2021 |
| CN | 113558489 | 10/2021 |
| CN | 114089639 | 2/2022 |
| DE | 102008042804 | 4/2009 |
| DE | 202013000669 U1 | 6/2013 |
| FR | 2597319 | 10/1987 |
| JP | 2008286466 | 11/2008 |
| KR | 20160069359 | 6/2016 |
| WO | 2022/204182 | 9/2022 |

OTHER PUBLICATIONS

International Search Report and Written Opinion of the International Searching Authority completed Jan. 22, 2021, in International Patent Application No. PCT/US2020/062211, 10 pages.

International Search Report and Written Opinion of the International Searching Authority completed Feb. 15, 2024, in International Patent Application No. PCT/US2023/080610, 19 pages.

International Search Report and Written Opinion of the International Searching Authority completed Oct. 20, 2022 (+ English translation), in International Patent Application No. PCT/CN2022/078958, 15 pages.

Casement Window: Site Visited Oct. 30, 2024, available from URL: https://www.archiexpo.com/prod/andersen/product-8990-1349389.html, 3 pages.

Drip EZ Pellet Grip Hopper Shelf, announced online Jun. 23, 2023, site visited Oct. 30, 2024, at https://www.bbqguys.com/drip-ez/pellet-grill-hopper-shelf-hs-1, 7 pages.

GMG Hopper Assembly for Ledge, site visited Oct. 30, 2024, available from URL: https://grillcollection.com/products/gmg-hopper-assembly-for-ledge-daniel-boone-and-peak-jim-bowie-12v-only-stainless-steel-lid-with-window, 6 pages.

International Search Report and Written Opinion of the International Searching Authority mailed Nov. 27, 2024, in International Patent Application No. PCT/US2024/044927, 13 pages.

* cited by examiner

DETACHABLE CAMERA FOR A SMOKER OR GRILL

RELATED APPLICATION

This application claims priority from U.S. Provisional Patent Application No. 63/321,660 filed Mar. 18, 2022, the contents of which is incorporated herein by reference.

FIELD OF THE INVENTION

This application relates to cameras for monitoring food cooking in a smoker or grill.

BACKGROUND OF THE INVENTION

Smokers and grills are popular cooking tools for preparing meats and other foods. Smokers often include a pellet feeding system in order to provide improved temperature control. Although somewhat precise control of temperature is possible, the actual cooking time of a food item can be quite variable. For smokers, the cooking time of a food item may be a number of hours and it is impractical and inconvenient to continually monitor cooking of the food item. In addition, observation of a food item using a conventional smoker requires opening a cooking chamber, which releases heat and slows down the cooking process.

SUMMARY OF THE INVENTION

In one aspect of the invention, a detachable camera assembly is securable to a cooking tool. The detachable camera assembly includes a housing and a camera mounted within the housing. A securement mechanism is secured to the housing and configured to mount the housing to the cooking tool with the camera having an interior of the cooking tool in a field of view thereof.

The securement mechanism may be one or more magnets. The one or more magnets may be positioned relative to the housing such that a gap is present between a lower surface of the housing and the cooking tool. The one or more magnets may be mounted within one or more cups secured to the lower surface of the housing. One or more cushions may be secured to each cup of the one or more cups and positioned to interface with the cooking tool when the housing is mounted to the cooking tool.

A camera opening may be formed in a lower surface of the housing, the camera being positioned over the camera opening. A shroud may extend outwardly from the camera opening and a seal may be positioned around the shroud at a distal end of the shroud. A fan may be mounted within the housing over a fan opening formed in the housing. The fan may be configured to draw air into the housing such that at least a first portion of the air is expelled through the camera opening and the shroud. The fan opening may be defined by the lower surface of the housing.

One or more lights may be mounted in the housing over one or more light openings defined by the lower surface of the housing such that at least a second portion of the air is expelled through the one or more light openings. The one or more lights may be one or more light-emitting diodes (LED).

A controller may be mounted within the housing and be coupled to the camera and a wireless transceiver. The controller may be configured to transmit images received from the camera using the wireless transceiver. The controller may be further configured to cause the camera to capture the images in response to instructions received using the wireless transceiver.

A method for observing cooking includes detachably mounting a camera assembly to a surface of a cooking tool having a viewing opening defined therein. The camera assembly includes a camera having an interior of the cooking tool in a field of view thereof through the viewing opening. The method further includes capturing images of the interior of the cooking tool using the camera. The method further includes the transmitting images from the camera using a controller having a wireless transceiver coupled thereto.

The camera assembly includes a housing, the camera mounted within the housing over a camera opening. The camera assembly further may further include a fan mounted within the housing over a fan opening defined by the housing. The method may further include drawing, by the fan, air into the housing and expelling at least a portion of the air through the camera opening. A shroud may extend between the camera opening and the viewing opening. A seal extends around the shroud and is pinched between the shroud and the surface of the cooking tool.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1A:
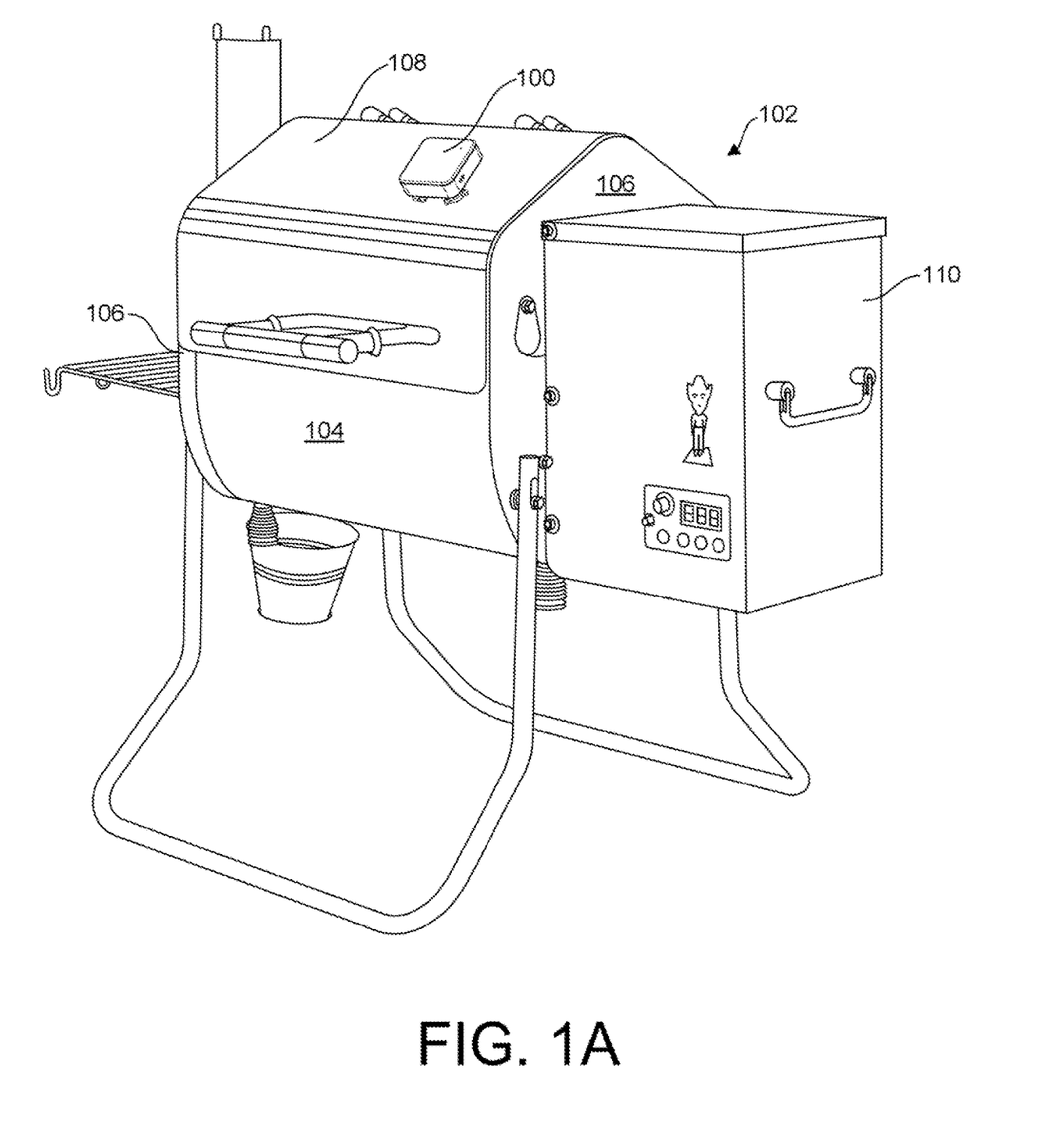
FIGS. 1A and 1B are isometric views of a smoker in use with a detachable camera assembly in accordance with an embodiment of the present invention.
Figure 1B:
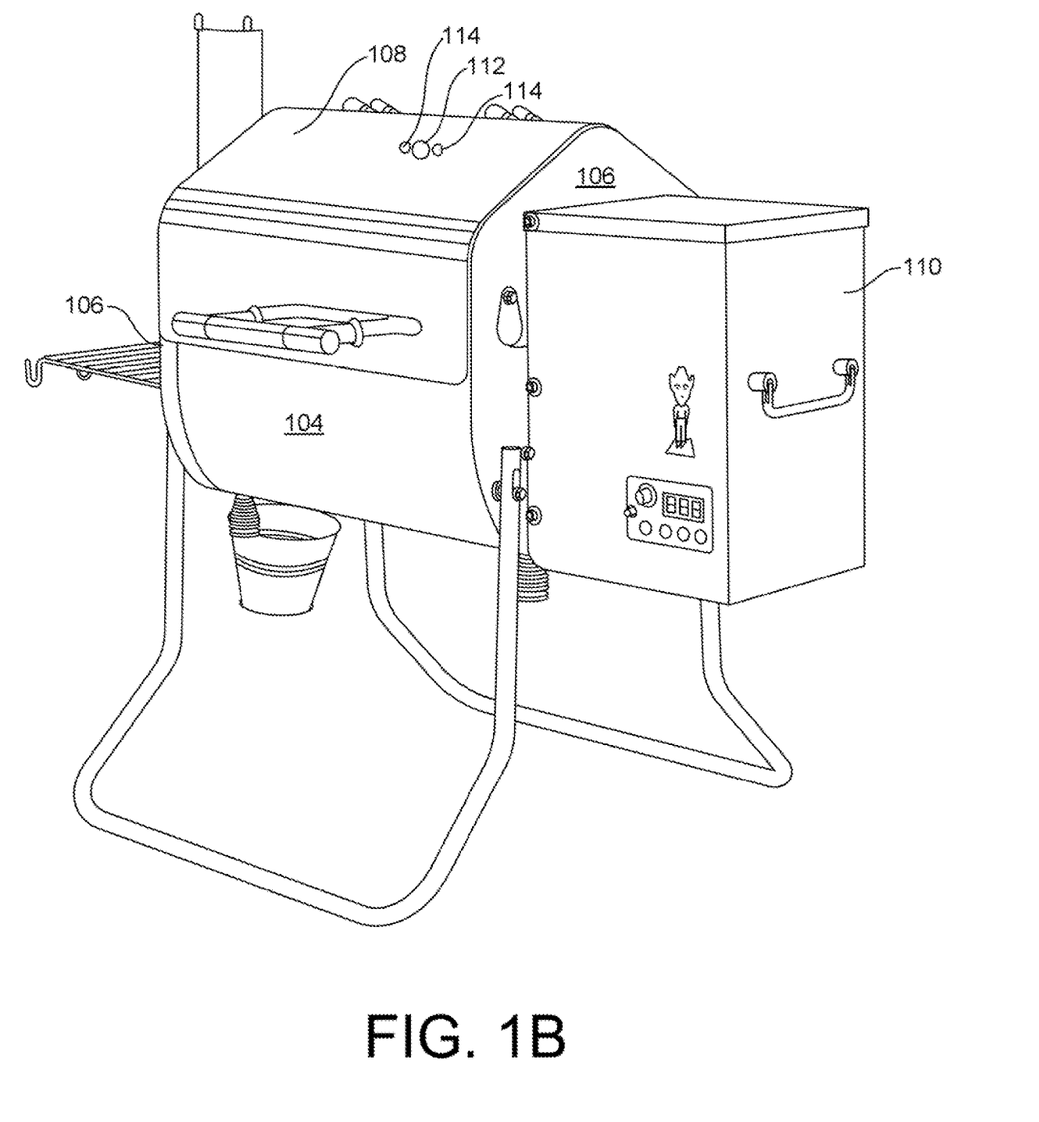

Referring to FIGS. 1A and 1B, a detachable camera assembly 100 may removably secure to a smoker 102. The detachable camera assembly 100 may secure to an outdoor grill, pizza oven, or any other type of cooking tool in a like manner. The smoker 102 may include a housing including a center wall 104 spanning between sidewalls 106. An opening may be defined in the center wall 104 and between the sidewalls 106. The opening may be selectively covered by a lid 108 that is hingedly attached to the center wall 104. A feeder housing 110 may be secured to one of the sidewalls 106 and house a pellet feeding mechanism for supplying pellets to a combustion in a controlled manner according to any approach known in the art.

In the illustrated implementation, the lid 108 defines one or more openings 112, 114 for enabling the detachable camera assembly 100 to view the interior of the smoker 102 when mounted to an exterior surface of the lid 108, e.g., an outwardly facing surface that is exposed to the environment of the smoker 102. In the illustrated implementation, a center opening 112 is aligned with a camera of the detachable camera assembly 100 and one or more lateral openings 114 on either side of the center opening 112 are aligned with lights of the detachable camera assembly 100 for illuminating the interior of the smoker 102. The lateral openings 114 may be aligned with the center opening, e.g., the centers of the openings 112, 114 being colinear. The openings 112, 114 may occupy an area that is smaller than the area covered by the detachable camera assembly 100 such that the openings 112, 114 are completely obscured when the detachable camera assembly 100 is in place as shown in FIG. 1A. Some or all of the openings 112, 114 may be unobstructed, i.e., not be covered by anything, including transparent or translucent materials.

In some implementations, the openings 112, 114 are defined by the center wall 104 or one of the sidewalls 106. In some implementations, multiple detachable cameras assemblies 100 may be used and multiple sets of openings 112, 114 may be defined by any of the center wall 104, sidewalls 106, and lid 108.

Figure 2A:
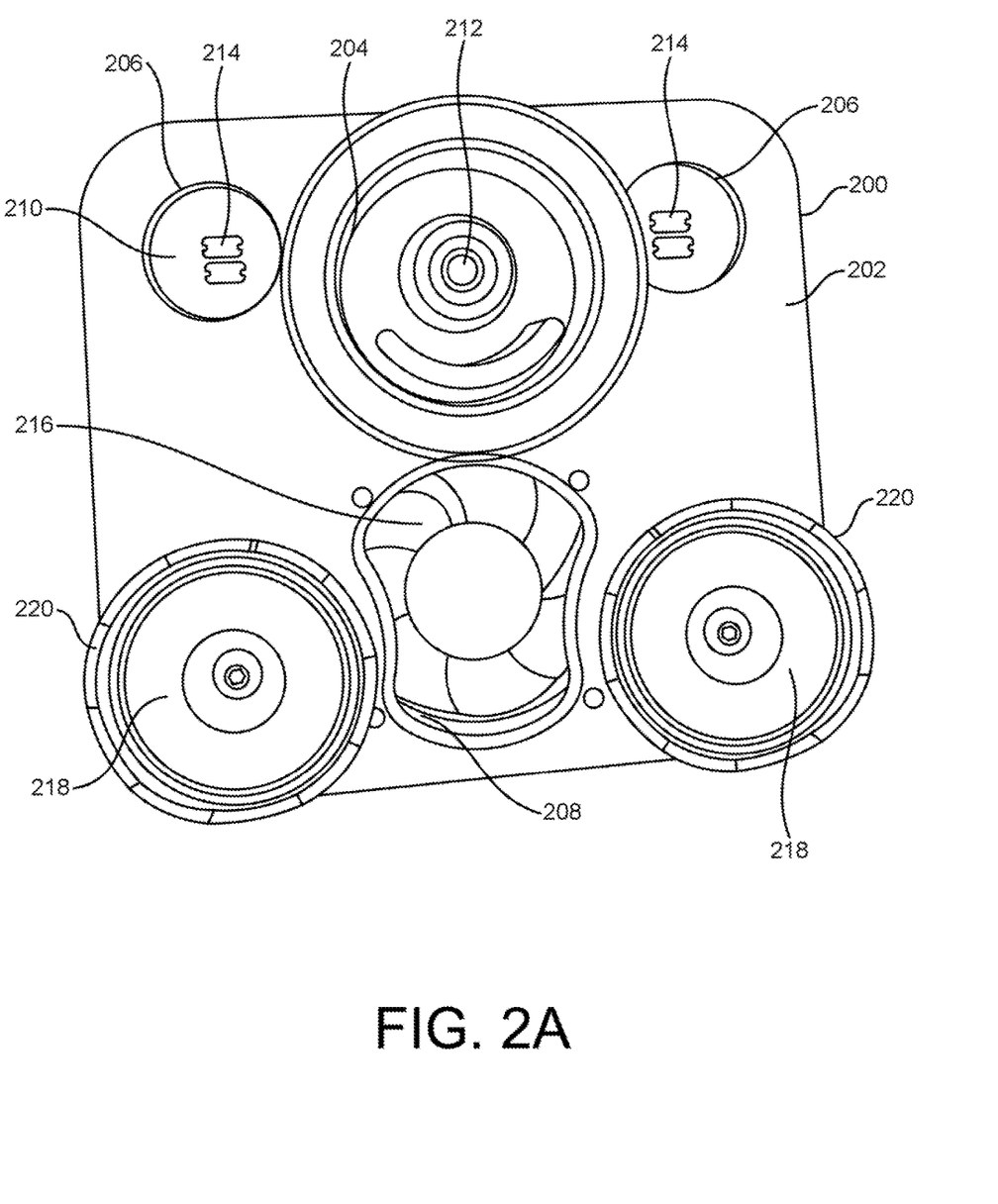
FIG. 2A is a bottom view of the detachable camera assembly in accordance with an embodiment of the present invention.
Figure 2B:
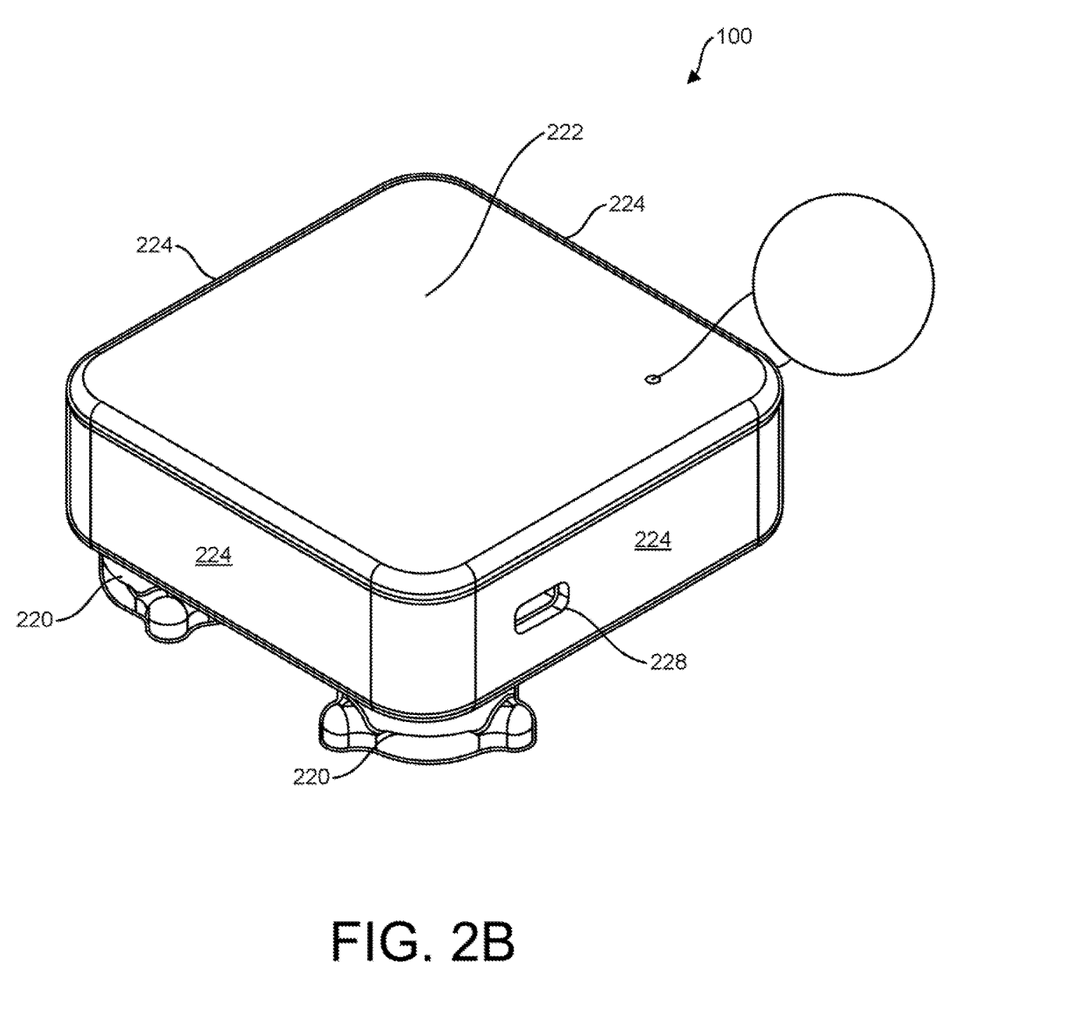
FIG. 2B is an isometric view of the detachable camera assembly in accordance with an embodiment of the present invention.

Referring to FIGS. 2A and 2B, the detachable camera assembly 100 may include a housing 200, which may have a generally cuboid shape with rounding at the corners and openings and other features formed thereon. The housing 200 may be made of a heat tolerant plastic such as polyetherimide, polyamide, polyether ether ketone, polyamide-imide, polybenzimidazole. Heat tolerant thermoplastics may also be used, such as polybenzimidazole (PBI), also known as CELAZOLE.

A lower surface 202 of the housing may define various openings. For example, the lower surface 202 may define a camera opening 204, one or more light openings 206, and a fan opening 208. A printed circuit board 210 mounted within the housing 200 may have some or all of the following mounted thereto: a camera 212 mounted thereto over the camera opening 204, one or more lights 214 (e.g., light-emitting diodes (LED)) mounted over the one or more light openings 206, and a fan 216 mounted over the fan opening 208. The arrangement of the camera opening 204 and one or more light openings 206 may correspond to the arrangement of the openings 112, 114. For example, when the opening 204 is positioned concentrically with the center opening 112, the one or more openings 206 may also be positionable concentrically with the one or more lateral openings 114.

One or more magnets 218 may also be mounted to the lower surface 202. In the illustrated embodiment, one or more cups 220 are mounted to the lower surface 202 and the magnets 218 are positioned within the cups. Each cup 220 and the magnet 218 positioned therein may be founded to the lower surface 202 by a single fastener, e.g. screw. Alternatively, the cup 220 may be fastened to the lower surface 202 by a first fastener and the magnet 218 may be fastened to the cup 220 by a second fastener. In the illustrated embodiment, the fan opening 208 is positioned between the magnets 218 and may have a non-circular shape including indentations corresponding to the cups 220.

Referring specifically to FIG. 2B, the housing 200 may further include an upper surface 222 positioned opposite to and parallel to the lower surface 202 and lateral surfaces 224 extending between the upper surface 222 and the lower surface 202. The upper surface 222 may be removable, e.g., a lid that is may be fastened over the lateral surfaces 224 by means of a interference fat, locking tabs, screws, or other fastening means.

The housing 200 may define additional openings such as an indicator opening 226 enabling light from an indicator to exit the housing 200 and a port opening 228 enabling a cable to be connected to the PCB 210. For example, the port opening 228 may enable a universal serial bus (USB) or other type of connector to connect to a corresponding socket connected to the PCB 210. In the illustrated embodiment, the indicator opening 226 is defined by the upper surface 222 and the port opening 228 is defined in one of the lateral surfaces 224.

Figure 3:
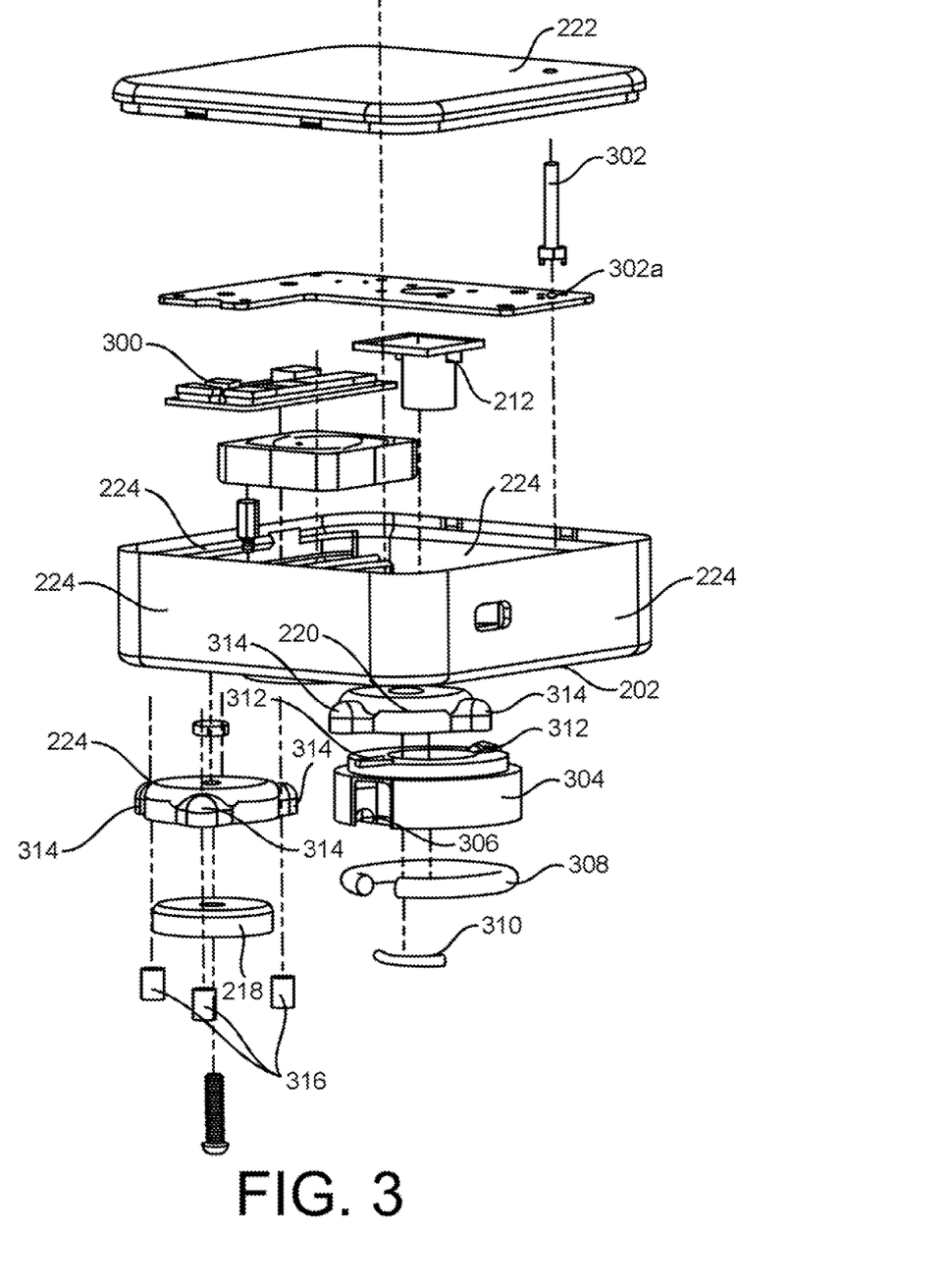
FIG. 3 is an exploded view of the detachable camera assembly in accordance with an embodiment of the present invention.

FIG. 3 illustrates an exploded view of the detachable camera assembly 100. In addition to the camera 212, lights 214, and fan 216, an internal computer 300 may be connected to the printed circuit board 210 and be programmed to control operation of the cameras 212, lights 214, and fan 216 and to manage collecting images from the camera 212 and transmitting images to a mobile device or server. The internal computer 300 may also receive and execute control signals from the mobile device or server. Such instructions may, for example, instruct the internal computer 300 to collect and transmit images at a defined interval, collect and transmit images at a predefined interval starting at a defined time, or collect an image and transmit the image in response to an instruction to do so.

In the illustrated embodiment, a light pipe 302 extends from the printed circuit board 210 and the indicator opening 226 in order to transmit light from an indicator light 302a, e.g., LED, on the printed circuit board 210 to the indicator opening 226. The internal computer 300 may cause the indicator light 302a to turn on when the detachable camera assembly 100 is turned on and may cause the indicator light 302a to output a particular color or blinking pattern in order to communicate the state of the detachable camera assembly 100.

In the illustrated embodiment, a shroud 304 is positioned around the camera opening 204 and spans between the camera opening 204 and at least part (e.g., at least 50 percent, 60 percent, or at least 80 percent) of a distance to the lid 108 when the detachable camera assembly 100 is attached to the smoker 102. The shroud 304 may define a groove 306 at a distal end thereof. A seal 308 may be positioned within the groove such that the seal 308 is pinched between the shroud 304 and the lid 108 when the detachable camera assembly 100 is attached to the smoker 102. The seal 308 may be made of a heat tolerant material and may also have thermal insulative properties to reduce heat transfer to the shroud 304 and the camera 212. The seal 308 may be made of an elastic material able to elastically deform responsive to being pinched between the shroud 304 and the lid 108. In the illustrated embodiment, the seal 308 is made of a section of high-temperature cord stock, such as graphite-impregnated rope gasket, such as is available from STANBROIL. In some embodiments, the seal 308 does not form a complete ring such that a second seal 310 extends across a gap in the seal 308.

When seated and uncompressed, one or both of the seals 308, 310 may protrude outwardly below the lower surface of the shroud 304 by between 0.5 and 2 mm. The seals 308, 310 may hinder the entry of exit of air through the interface between the interface between the shroud 304 and the lid 108. For example, the fan 216 may draw air into the housing 200 through the fan opening 208 and expel the air through the openings 204, 206. The seals 308, 310 may guide a portion of this air flow through the opening 112 in the lid 108 thereby reducing the amount of hot air incident on the camera 212.

Figure 4:
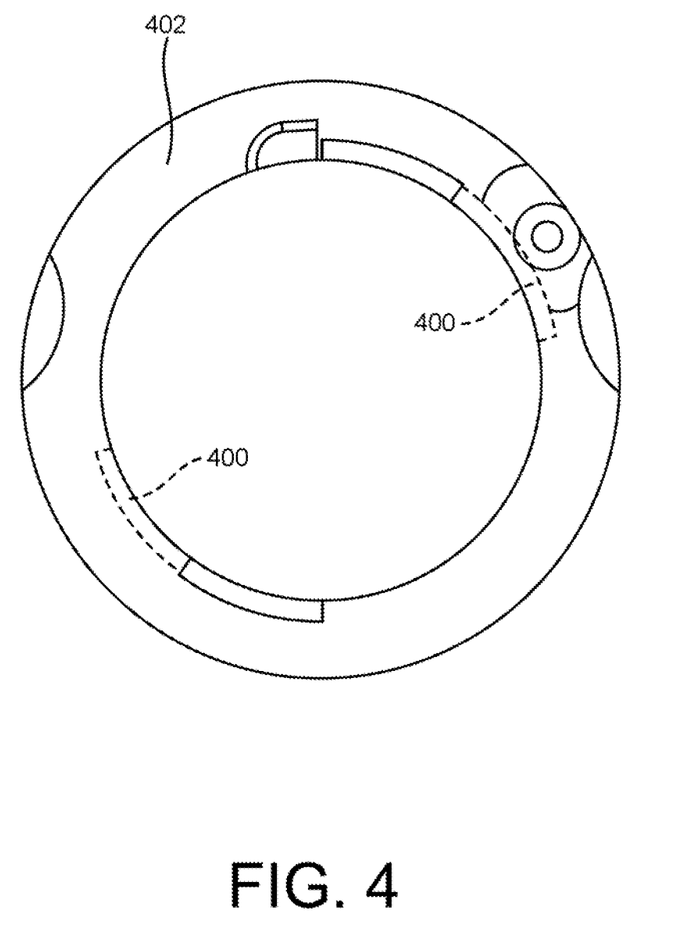
FIG. 4 is a bottom view of a twist lock attachment structure for a camera in accordance with an embodiment of the present invention.

In the illustrated embodiment, the shroud 304 is removably secured to the lower surface 202, such as by means of a twist lock mechanism. For example, referring to FIG. 4, while still referring to FIG. 3, the shroud 304 may define locking tabs 312 that seat within circumferential grooves 400 formed in a receptacle 402 upon rotation of the shroud 304 within the receptacle 40. The receptacle 402 may be fastened to the lower surface 202 by means of adhesive, screws, co-molding, or other fastening means.

In some embodiments, each cup 220 includes one more receptacles 314, such as three receptacles 314 distributed around the magnet 218 within the cup 220. A cushion 316 may be positioned within each receptacle 314 such that when completely inserted, at least a portion, e.g., between 0.5 and 2 mm of the cushion 316 protrudes from the receptacle 314. The cushions 316 may be made of the same resilient and heat tolerant material as the seals 308, 310 or a different resilient and heat tolerant material.

The detachable camera assembly 100 has various features to promote cooling. The cups 220 help maintain the lower surface 202 offset from the lid 108 creating an insulative air gap. Air drawn into the opening 208 by the fan 216 will then be expelled out of the openings 206 for the lights 214 and the opening 204 for the camera 212. The seals 308, 310 provide a substantially sealed path between the opening 204 and the opening 112 in the lid 108. The air flow from the fan 216 will therefore flow away from the camera 212 and through the opening 112 thereby reducing or preventing the flow of hot air from within the smoker 102 onto the camera 212.

Figure 5:
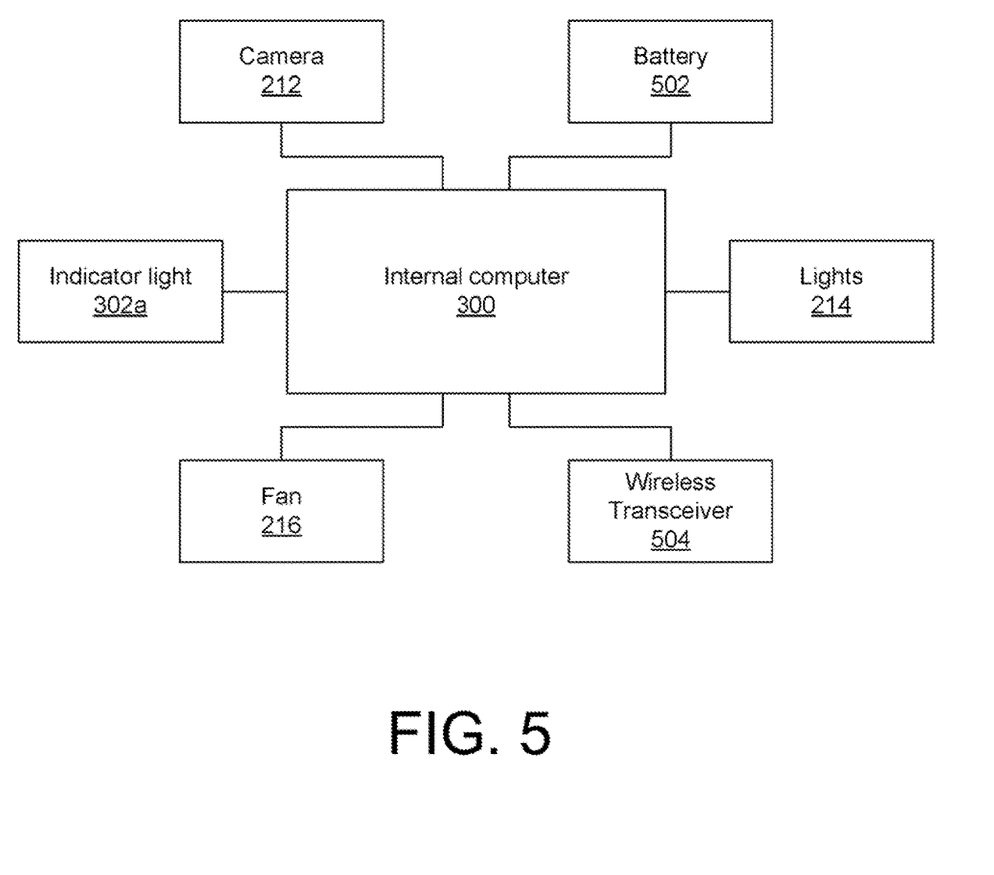
FIG. 5 is a schematic block diagram of components of a detachable camera assembly in accordance with an embodiment of the present invention.

FIG. 5 is a schematic diagram illustrating components of the detachable camera assembly 100. The internal computer 212 may be coupled to the cameras 212, lights 214, fan 16, and indicator light 302a. The internal computer 212 may further be coupled to a battery 502 and a wireless transceiver 504. The internal computer 212 may be configured as a controller that is enabled to receive instructions using the wireless transceiver 504, such as instructions to capture an image using the cameras 21, instructions to transmit images, or other instructions. The internal computer 212 may be further configured to receive instructions from and transmit images to a mobile device, server, or other computing device.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A detachable camera assembly for securement to a cooking tool, the detachable camera assembly comprising:
    a housing;
    a camera mounted within the housing;
    a camera opening formed in a lower surface of the housing, the camera being positioned over the camera opening;
    a shroud extending outwardly from the camera opening; and
    a securement mechanism secured to the housing and configured to mount the housing to the cooking tool with the camera having an interior of the cooking tool in a field of view thereof.

2. The detachable camera assembly of claim 1, wherein the securement mechanism is one or more magnets.

3. The detachable camera assembly of claim 2, wherein the one or more magnets are positioned relative to the housing such that a gap is present between a lower surface of the housing and the cooking tool.

4. The detachable camera assembly of claim 3, wherein the one or more magnets are mounted within one or more cups secured to the lower surface of the housing.

5. The detachable camera assembly of claim 4, further comprising one or more cushions secured to each cup of the one or more cups and positioned to interface with the cooking tool when the housing is mounted to the cooking tool.

6. The detachable camera assembly of claim 1, wherein the cooking tool is one from a group consisting of a grill, smoker or pizza oven.

7. The detachable camera assembly of claim 1, further comprising a seal positioned around the shroud at a distal end of the shroud.

8. The detachable camera assembly of claim 7, further comprising a fan within the housing over a fan opening formed in the housing, the fan configured to draw air into the housing such that at least a first portion of the air is expelled through the camera opening and the shroud.

9. The detachable camera assembly of claim 8, wherein the fan opening is defined by the lower surface of the housing.

10. The detachable camera assembly of claim 8, further comprising one or more lights mounted in the housing over one or more light openings defined by the lower surface of the housing.

11. The detachable camera assembly of claim 10, wherein the light openings are configured such that at least a second portion of the air is expelled through the one or more light openings.

12. The detachable camera assembly of claim 11, wherein the one or more lights are one or more light-emitting diodes (LED).

13. The detachable camera assembly of claim 1, further comprising a controller within the housing and coupled to the camera and a wireless transceiver, the controller configured to transmit images received from the camera using the wireless transceiver.

14. The detachable camera assembly of claim 13, wherein the controller is further configured to cause the camera to capture the images in response to instructions received using the wireless transceiver.

15. A method for observing cooking comprising:
    detachably mounting a camera assembly to an exterior surface of a cooking tool having a viewing opening defined therein, the viewing opening being unobstructed, the camera assembly comprising:
        a housing having a camera opening formed in a lower surface of the housing;
        a camera mounted within the housing over the camera opening such that the camera has a field of view through the viewing opening; and
        a shroud extending outwardly from the camera opening; and
    capturing images of the interior of the cooking tool using the camera.

16. The method of claim 15, wherein the camera assembly comprises a controller coupled to the camera and to a wireless transceiver, the method further comprising transmitting, by the controller, the images using the wireless transceiver.

17. The method of claim 15, wherein the camera assembly comprises a fan mounted within the housing over a fan opening defined by the housing, the method further comprising drawing, by the fan, air into the housing and expelling at least a portion of the air through the camera opening.

18. The method of claim 15, wherein the cooking tool is one from a group consisting of a grill, smoker or pizza oven.

19. The method of claim 15, wherein the camera assembly comprises a seal extending around the shroud and pinched between the shroud and the surface of the cooking tool.

20. The method of claim 15, wherein the camera assembly is detachably mounted to the exterior surface of the cooking tool using one or more magnets.

* * * * *